United States Patent
Sandmeyer et al.

(10) Patent No.: US 9,988,496 B2
(45) Date of Patent: *Jun. 5, 2018

(54) METHOD FOR PRODUCING ORGANOPOLYSILOXANES

(71) Applicant: Wacker Chemie AG, Munich (DE)

(72) Inventors: Frank Sandmeyer, Burgkirchen (DE); Georg Loessel, Emmerting (DE); Marko Prasse, Glaubitz (DE)

(73) Assignee: WACKER CHEMIE AG, Munich (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/535,453

(22) PCT Filed: Jul. 21, 2016

(86) PCT No.: PCT/EP2016/067459
§ 371 (c)(1),
(2) Date: Jun. 13, 2017

(87) PCT Pub. No.: WO2017/016988
PCT Pub. Date: Feb. 2, 2017

(65) Prior Publication Data
US 2017/0349709 A1    Dec. 7, 2017

(30) Foreign Application Priority Data

Jul. 30, 2015 (DE) .................... 10 2015 214 502

(51) Int. Cl.
*C08G 77/06* (2006.01)
*C08G 77/18* (2006.01)

(52) U.S. Cl.
CPC ............. *C08G 77/06* (2013.01); *C08G 77/18* (2013.01)

(58) Field of Classification Search
None
See application file for complete search history.

(56) References Cited

U.S. PATENT DOCUMENTS

| | | |
|---|---|---|
| 2,517,777 A | 8/1950 | Fenn et al. |
| 2,661,348 A | 12/1953 | Welsh et al. |
| 2,719,859 A | 10/1955 | Nitzsche et al. |
| 2,758,124 A | 8/1956 | Schwenker |
| 3,489,782 A | 1/1970 | Pruvost et al. |
| 3,792,071 A | 2/1974 | Nitzsche et al. |
| 4,209,454 A | 6/1980 | Graf et al. |
| 4,298,753 A | 11/1981 | Schinabeck et al. |
| 5,223,636 A | 6/1993 | Koshimura et al. |
| 6,767,982 B2 * | 7/2004 | Standke ............ C07F 7/0872 528/10 |
| 2002/0086907 A1 | 7/2002 | Standke et al. |
| 2005/0288473 A1 | 12/2005 | Deforth et al. |
| 2006/0167202 A1 | 7/2006 | Schattenmann et al. |
| 2006/0167297 A1 | 7/2006 | Schattenmann et al. |
| 2007/0078277 A1 | 4/2007 | Ackermann |
| 2010/0076170 A1 | 3/2010 | Staiger |
| 2012/0202960 A1 | 8/2012 | Staiger |

FOREIGN PATENT DOCUMENTS

| | | |
|---|---|---|
| DE | 854708 A | 11/1952 |
| DE | 953661 A | 12/1956 |
| DE | 954198 A | 12/1956 |
| DE | 1302773 B | 8/1972 |
| DE | 2415331 A1 | 10/1975 |
| DE | 102005003898 A1 | 8/2006 |
| DE | 102005003899 A1 | 8/2006 |
| DE | 102005047394 A1 | 4/2007 |
| DE | 102007004838 A1 | 7/2010 |
| DE | 102009045930 A1 | 4/2011 |
| EP | 0032376 A2 | 7/1981 |
| EP | 1205505 A2 | 5/2002 |
| EP | 1772475 A1 | 4/2007 |
| GB | 674137 A | 6/1952 |
| GB | 1192506 A | 5/1970 |

\* cited by examiner

*Primary Examiner* — Clinton A Brooks
(74) *Attorney, Agent, or Firm* — Brooks Kushman P.C.

(57) ABSTRACT

Highly condensed silicon resins are obtained by a three step continuous procedure without the use of organic solvent, by preliminarily forming a partial alkoxylate by reacting a chlorosilane with alcohol containing no or a minimal amount of water, feeding the partial alkoxylate to a reaction column to form a silicone resin of low degree of condensation, and further condensing the silicone resin intermediate thus formed to produce a silicone resin product.

4 Claims, No Drawings

METHOD FOR PRODUCING ORGANOPOLYSILOXANES

CROSS REFERENCE TO RELATED APPLICATIONS

This application is the U.S. National Phase of PCT Appln. No. PCT/EP2016/067459 filed Jul. 21, 2016, which claims priority to German Application No. 10 2015 214 502.6 filed Jul. 30, 2015, the disclosures of which are incorporated in their entirety by reference herein.

BACKGROUND OF THE INVENTION

1. Field of the Invention

The invention relates to a partly or fully continuous process for preparing branched organopolysiloxanes from chlorosilanes over three stages by reaction with alcohol and water to the desired level of condensation, where the entire process works without the use of additional organic solvents, no wastewater is produced and the process is particularly suitable for the controlled, gelation-free condensation of very reactive chlorosilanes or chlorosilane mixtures.

2. Description of the Related Art

Processes for preparing branched organopolysiloxanes, also referred to as silicone resins, have been known in prior art for some time.

Compared to the hydrolysis of alkoxysilanes for preparation of organopolysiloxanes (see, for example, DE1302773), hydrolysis proceeding from chlorosilanes has the advantage that the preparation and isolation of the alkoxysilanes is dispensed with, which gives rise to economic advantages.

Both continuous and batchwise processes for preparing organopolysiloxanes from chlorosilanes have long been known from numerous publications and patent specifications in the prior art.

Reference may be made here to patent specifications GB1192506, DE953661C, DE854708C and DE2415331 A, US2005288473 as examples of batchwise processes.

A disadvantage of these processes is the high dilution necessary during the reaction, which is caused by the high reactivity of the chlorosilanes. A further disadvantage of the processes is caused by the large excesses of water, which leads to phase separation at the end of the reaction, wherein hydrochloric acid released is absorbed or neutralized in the aqueous phase. Viewed on the industrial scale, firstly, a large amount of waste has to be disposed of and, secondly, the hydrochloric acid is lost, since it is recoverable only under uneconomical conditions.

For an example of continuous chlorosilane hydrolyses, reference may be made to U.S. Pat. No. 3,489,782, DE954198, DE102005047394 A1, DE102009045930 A1 and DE102007004838 A1. These processes also require large amounts of water, which leads to the abovementioned wastewater problems and, here too, the aqueous hydrochloric acid is again recoverable only under uneconomical conditions.

In addition to these batchwise and continuous processes, technologies using a column have also become established. These column processes enable a distinct improvement in the reaction regime. Thus, no wastewater phases are produced any longer and the hydrochloric acid released can be recovered as a gas at the top of the column. Corresponding processes are described in U.S. Pat. No. 2,719,859, U.S. Pat. No. 3,792,071, U.S. Pat. No. 4,298,753, U.S. Pat. No. 6,767,982, U.S. Pat. No. 5,223,636 and U.S. Pat. No. 4,209,454. A disadvantage common to all these processes is that they lead exclusively to oligomers having a low level of condensation. More highly condensed polyorganosiloxanes are unobtainable by these processes.

U.S. Pat. No. 2,719,859 teaches a process for preparing polyorganosiloxanes in a column, which is characterized in that the hydrolyzable silanes are introduced in fine distribution into a continuous stream of an aqueous hydrolysis medium, the hydrolysis medium always being present in excess. The process requires large amounts of water which have to be processed or disposed of at a later stage as wastewater. Since the hydrolysis medium is always used in excess and is used for product discharge, the column is always filled to a considerable degree with the hydrolysis medium, which results in a low space-time yield. It is possible to use silanes which can be stabilized to give cyclic polysiloxanes, or silane mixtures containing a sufficient amount of end stoppers, in solvent-free form. Network-forming silanes which form T or Q units on complete condensation can be used, without forming insoluble gels, only in diluted form in inert solvents and in the presence of less reactive silanes, which makes the workup more complicated and significantly restricts the range of applicability of the process.

U.S. Pat. No. 3,792,071 teaches a continuous process for preparing alkoxysilanes, or alkoxypolyorganosiloxanes having a low level of condensation, from chlorosilanes. The process is executed using a distillation column as a reaction vessel. The chlorosilane, an alcohol required for alkoxylation and water required for the condensation for preparation of polyorganosiloxanes are fed into the column at various points. The chlorosilane is introduced at the top of the column, and the alcohol in a column portion below that or in the lower third of the column. Since the internal temperature of the column within the majority of the column is always kept at least half a degree above the boiling point of the alcohol, the alcohol is in gaseous form in the column and meets the chlorosilane moving downward in a countercurrent flow. For the preparation of alkoxysilanes, no solvent and no water is required in this process. For preparation of condensed polyorganosiloxanes, this process requires both; therefore, a further inert organic solvent such as toluene is present in the column as well as the alcohol present in any case, and has a boiling point above that of the alcohol used. The solvent is introduced into the column by dissolving the chlorosilane in the solvent and feeding it into the column as a solution. Water and alcohol are fed into the column at a temperature just above their boiling temperature, such that they are fed into the column in gaseous form.

The chlorosilane is at ambient temperature before it is fed into the column.

A molar excess of alcohol is always used, based on the moles of silicon-bonded chlorine used.

It is a feature of the process that a very low residual acid content in the single-digit ppm range is obtained in the products, without any requirement for dedicated neutralization or washing steps after the column process for the purpose.

Disadvantages of this process are the low space-time yield, the susceptibility of olefinically unsaturated silanes to polymerization under the reaction conditions of the process (as shown in comparative examples A and B in U.S. Pat. No. 4,298,753), and the fact that it is necessary to use an inert organic solvent for the condensation to give polyorganosiloxanes that is difficult to remove at a later stage.

Solvent-intolerant end-use applications such as personal care therefore cannot be served with such products, or the residual traces of solvent have to be removed from the products at considerable cost and inconvenience, which makes them uneconomical.

A further disadvantage is that the column is always operated at elevated temperature and, since some chlorosilanes, for instance methyltrichlorosilane, have relatively low boiling points, mixtures of various chlorosilanes are separated from one another in the column and hence react with one another in what are fairly random ratios, such that it is more difficult by this process to prepare a polyorganosiloxane in constant composition from chlorosilane mixtures.

U.S. Pat. No. 4,209,454 teaches a continuous process for preparing polyorganoalkoxysiloxanes. In this process, chlorosilanes are applied directly to a column positioned atop a reactor. The chlorosilanes have to be applied at a particular minimum distance from the reactor in order to permit a sufficiently long reaction time. The reactor contains alcohol, water and the polyorganosiloxane to be prepared. No further solvent is present in the apparatus. The contents of the reactor are heated to boiling, such that the alcohol and possibly water meet the chlorosilane in a countercurrent flow.

The advantage of this process is that it is possible here to better control the alkoxy content than in other processes that propose a similar procedure, for instance GB674137, such that the tendency to form gel is better controlled in this procedure, as demonstrated by the examples of U.S. Pat. No. 4,209,454, especially with respect to GB674137.

However, this process is intolerant to olefinically unsaturated silicon-bonded substituents. Since the column is always operated at boiling temperature of the evaporable constituents from the reactor and some chlorosilanes, for instance methyltrichlorosilane, have relatively low boiling points, mixtures of various chlorosilanes, for instance phenyltrichlorosilane and methyltrichlorosilane, are separated from one another in the column and some of them are released into the offgas and hence lost. Thus, the process exhibits comparatively poor economic viability, since higher amounts of reactant are required per unit of product. Moreover, shifts in the stoichiometric composition cannot be ruled out, and so it is also more difficult by this process to prepare a polyorganosiloxane with constant composition from chlorosilane mixtures.

U.S. Pat. No. 4,298,753 teaches a two-stage alkoxylation process, or a two-stage alkoxylation and condensation process, for preparing alkoxysilanes, or for preparing polyorganoalkoxysiloxanes having a low level of condensation, in which a column is used for the second condensation stage. The first condensation stage is likewise performed continuously, for which a reactor connected upstream of the column is used, which may be a stirrer system or a loop. The chlorosilane and the alcohol are metered into this preliminary reactor in parallel, the alcohol being used in a substoichiometric amount based on the amount of hydrolyzable silicon-bonded chlorine. The preliminary reactor is unheated. The reaction mixture thus obtained is discharged from the preliminary reactor at a temperature of the formulation between 0 and 20° C. and applied to the top of the column. The column is set to an elevated temperature. Further alcohol is fed into the column below the metering point for the reaction mixture from the preliminary reactor, at least in an amount sufficient to fully hydrolyze all the silicon-bonded chloride radicals present. Water is fed into the column for a condensation, not into the preliminary reactor.

The chlorosilane is at ambient temperature before it is fed into the reactor. The process is also practicable for mixtures of various chlorosilanes. If water is fed into the column for a condensation, the chlorosilanes are dissolved in an inert solvent, the boiling point of the inert solvent being above the temperature at which the column is operated.

Suitable alcohols are those whose boiling point is below the boiling point of the chlorosilanes used.

Hydrochloric acid is recovered both from the preliminary reactor and from the reaction column. The products obtained have residual hydrochloric acid contents in the single-digit ppm range.

The process is efficient and suitable for preparing alkoxysilanes in solvent-free form. No example is given for the preparation of organopolysiloxanes. A disadvantage in this case too is that the use of additional inert solvents such as toluene is required for the preparation of polyorganosiloxanes, and these have to be removed in a costly and inconvenient manner at a later stage. The later devolatilization of the target products also affords solvent mixtures of the respective alcohol and the additional inert solvent which, because of the reaction regime, cannot simply be reused, but first have to be separated from one another in a costly and inconvenient manner if this is not prevented by the formation of azeotropic mixtures and similar effects.

U.S. Pat. No. 5,223,636 teaches a column process for preparing polyorganoalkoxysiloxanes, in which a column positioned atop a reactor is used. At the start, an alkoxysilane which is the fully alkoxylated version of the halosilane which is applied continuously to the columns during the process is fed into the reactor. Water and alcohol are fed continuously into the reactor. The halosilane, in a countercurrent flow of the boiling components out of the reactor, particularly the alcohol, is alkoxylated and, together with the alkoxysilane, hydrolyzed and condensed, using the hydrohalic acid which is released during the halosilane alkoxylation and hydrolysis as an acid catalyst. This procedure has the advantage that no acid catalyst has to be specially added, but has the disadvantage that the amount of acid is not just more difficult to control but is also distinctly higher than in the case of a specific addition. Since it is customary to feed in the acid from a fixed pipe connection in such plants on the production scale, the advantage of the catalyst saving can be assessed as being comparatively minor, since it is opposed by the great disadvantage of the difficulty of controlling the reaction conditions. Moreover, relatively large amounts of acid remain in the product, and have to be removed subsequently. In such a procedure, there are limits to the level of condensation achievable. Such a procedure is acceptable for low levels of condensation. However, there is a significant rise in the tendency to gelation with increasing condensation level, such that the robustness of the process is only inadequate at relatively high levels of condensation.

In order to control the amount of hydrohalic acid as far as possible, U.S. Pat. No. 5,223,636 proposes using an auxiliary gas stream in order to drive hydrogen halide gas out of the reaction system. This significantly more complicated process thus completely negates the purported advantage.

As shown by the examples of U.S. Pat. No. 5,223,636, the amounts of HCl remaining in the product are distinctly greater than 100 ppm, which even at the time of patent filing was already outdated prior art.

U.S. Pat. No. 6,767,982 teaches a continuous two-stage process for preparing linear polyorganoalkoxysiloxanes where every silicon atom bears at least one alkoxy substituent, characterized in that in a first step in a first reactor a partial alkoxylate is prepared from a mixture of halosilanes, alcohol and water, which is then routed in a second step to a reactive distillation column in which the further condensation to the end product takes place with simultaneous feeding of further alcohol. Optionally, the reaction mixture, in the transfer from the preliminary reactor to the column, is sent through a heating unit and heated. The process affords hydrohalic acid in gaseous form, which is removed from the system. The hydrohalic acid dissolved in the liquid phase remains in the system. Here, similarly to the manner already described in U.S. Pat. No. 5,223,636, hydrohalic acid produced during the synthesis is used as catalyst.

In other words, the liquid phase is oversaturated with hydrohalic acid. Since water is already present in the first step of this process, hydrohalic acid is dissolved up to saturation of the aqueous alcoholic phase, such that a saturated aqueous halogen acid environment is present for the hydrolysis and condensation. In example 1 in EP1772475 B1, where a partly comparable continuous process for preparing polyorganosiloxanes is described, it is stated that such a saturated ethanol/water solution is very reactive and, to reduce its reactivity, considerable dilution is required, in the case of EP1772475 B1 with water, in order to minimize its reaction-driving effect. EP1772475 B1 uses a water-insoluble inert organic solvent for the polyorganosiloxane, in order to protect it from excessive condensation and extract it from the water/ethanol phase. In this way, according to EP1772475 B1, high levels of condensation are possible. In the case of U.S. Pat. No. 6,767,982, precisely such a concentrated ethanol/water mixture is added, but the use of solvents is simultaneously dispensed with. Such a procedure is limited to low levels of condensation, since there is an unacceptable rise in the risk of gelation with increasing condensation and the process can no longer be run robustly. It is therefore logical what U.S. Pat. No. 6,767,982 is aimed solely at linear polyorganosiloxanes which must have an alkoxy content of more than 25 mol %.

Moreover, the use of water in a process stage in which even greater amounts of hydrohalic acid form has the result that a greater proportion of hydrohalic acid is entrained into the workup of the liquid phases and is thus lost or has to be disposed of in the waste stream.

DE102005003899 A1 teaches a process for continuously preparing low alkoxy content silicone resins. The aim of this process is the preparation of highly condensed organopolysiloxanes, for example solid silicone resins. The process is characterized in that halosilane is converted in the presence of water and alcohol in a column, with the desired organopolysiloxane likewise already present in the reaction system. Water and alcohol are added to the reaction unit to such an extent that more water is always present than required for complete hydrolysis of all silicon-bonded halogen groups. The excess of water allows the control of the condensation reaction. It is executed in a system composed of two different distillation columns, the first of which is designed as a straight reaction column, the second as a reaction and devolatilization unit. This process too requires the addition of inert organic solvents, for example aromatic solvents, since highly condensed organopolysiloxanes that have a high viscosity are formed. These can be handled only in solution.

DE102005003898 A1 teaches a continuous process for preparing alkoxy-functional polysiloxanes from chlorosilanes, wherein the reaction unit is a twin column system having a preliminary reactor. The great advantage of this arrangement is that the preparation of a partial alkoxylate in the preliminary reactor gives rise only to a comparatively small amount of hydrochloric acid gas in the column system. The smaller volume of the hydrochloric acid gas thus no longer has a capacity-limiting effect to such a high degree in the columns, and there is therefore a distinct rise in the space-time yield of the column system.

The second column is run as a stripping column and makes no contribution to the condensation. In the second column, an inert organic solvent is optionally used. There is no explicit statement here about the cases in which there is a need to use such an inert organic solvent. However, it is obvious that the solvent-free mode of operation in accordance with this process is at least problematic and hence is not possible throughout, even though the target products obtained are alkoxy-rich siloxanes not having a high level of condensation, but having only a low level of condensation.

The process is only suitable for producing highly alkoxy-functional oligomers having a low level of condensation, but not for establishing higher levels of condensation.

OBJECTS OF THE INVENTION

It is an object of the invention to provide a partly or fully continuous, economically viable process for preparing polyorganoalkoxysiloxanes from chlorosilanes or mixtures of chlorosilanes which
 permits reproducible preparation of polyorganosiloxanes of constant composition from mixtures of various chlorosilanes,
 works entirely without the use of inert organic solvents, i.e. which contains only the organic components required as reactants in the reaction mixture,
 does not produce any wastewater phase,
 makes it possible to obtain products having very low residual acid contents<10 ppm
 permits controlled setting of the alkoxy contents from high to low levels, such that it is suitable for providing both low molecular weight and high molecular weight polyorganosiloxanes up to and including solids, and hence permits the highest levels of condensation in a robust procedure
 has a recovery rate for the hydrohalic acid released of at least 95%.

SUMMARY OF THE INVENTION

It has been surprisingly found, that these and other objects are achieved by the present invention, in which an at least three stage, fully or semicontinuous, preparation is used, wherein a partial alkoxylate is formed in a first stage, with alcohol and minimal water, the partial alkoxylate is condensed in a second stage to form a silicone resin intermediate having a low degree of condensation, and the silicone resin intermediate is condensed in the presence of catalytic traces of acid in a further stage, with no solvent other than the alcohol used to form the partial alkoxylate being used in the process.

DETAILED DESCRIPTION OF THE PREFERRED EMBODIMENT

The invention thus provides a fully continuous process for preparing branched organopolysiloxanes, wherein
 in a first step in a preliminary reactor at least one chlorosilane is continuously reacted with alcohol to give a partial alkoxylate, wherein a) 0.1 to 2.0 mol of alcohol is used per mole of hydrolyzable chlorine, and b) the alcohol contains not more than 5% by weight of water, and in a second step the partial alkoxylate obtained in the first step is transferred into a column as a first reaction unit, wherein a continuous reaction a) with alcohol and water, or b) with alcohol, water and at least one further chlorosilane which differs from the chlorosilane from the first step as follows:

it is less volatile, i.e. has a higher boiling point, and may additionally have lower reactivity, is effected to give a polyorganosiloxane mixture (=silicone resin intermediate) having a low level of condensation, and in a third step the silicone resin intermediate from the second step is transferred into a continuous loop reactor, or a stirred batchwise reactor with continuous feed and drain or a stirred tank cascade connected in a continuous system as a second reaction unit, wherein a reaction a) with alcohol and water and in the presence of catalytic traces of hydrogen chloride, or b) with alcohol and water and in the presence of catalytic traces of hydrogen chloride and with addition of further alkoxy- and/or hydroxy-functional organopolysiloxanes or alkoxy- and/or hydroxy-functional silanes, is effected to give the end product, a branched organopolysiloxane having the desired level of condensation, with the proviso that no other solvent apart from the alcohol used is used over the entire process, where this alcohol may consist of just one kind of alcohol or of a mixture of at least two different alcohols.

The invention further provides a semicontinuous process for preparing branched organopolysiloxanes, wherein in a first step in a preliminary reactor at least one chlorosilane is continuously reacted with alcohol to give the partial alkoxylate, wherein a) 0.1 to 2.0 mol of alcohol is used per mole of hydrolyzable chlorine, and b) the alcohol contains not more than 5% by weight of water, and in a second step the partial alkoxylate obtained in the first step is transferred into a column as a first reaction unit, wherein a continuous reaction a) with alcohol and water, or b) with alcohol, water and at least one further chlorosilane which differs from the chlorosilane from the first step as follows:

it is less volatile, i.e. has a higher boiling point, and may additionally have lower reactivity, is effected to give a polyorganosiloxane mixture (=silicone resin intermediate) having a low level of condensation, and in a third step the silicone resin intermediate from the second step is transferred into a stirred batchwise reactor as a second reaction unit, wherein a reaction a) with alcohol and water and in the presence of catalytic traces of hydrogen chloride, or b) with alcohol and water and in the presence of catalytic traces of hydrogen chloride and with addition of further alkoxy- and/or hydroxy-functional organopolysiloxanes or alkoxy- and/or hydroxy-functional silanes, is effected to give the end product, a branched organopolysiloxane with the desired level of condensation, with the proviso that no other solvent apart from the alcohol used is used over the entire process, where this alcohol may consist of just one kind of alcohol or of a mixture of at least two different alcohols.

A further embodiment both of the fully continuous and partly continuous process of the invention is characterized in that the hydrochloric acid-containing tops distillate of the column obtained in a second step is condensed and returned just below the feed point of the reaction mixture from the preliminary reactor to the column, such that it does not get into the bottom of the column and hence the hydrochloric acid released in the column is removed completely from the reaction system, and, as a result, the silicone resin intermediate is obtained in the bottom of the reaction column without further workup with a residual hydrochloric acid content of less than 100 ppm.

Thereafter, a workup/purification of the end product (=highly condensed, branched organopolysiloxanes) can be effected by devolatilization. This frees it of volatile constituents and it is present thereafter in its pure and hence final form. The devolatilization can be varied as desired, in which case the procedures are all within the scope of the known prior art and comprise distillations, for example. Further examples of suitable variations are set out in detail below. The distillate which is obtained after the third step in the devolatilization of the product is referred to in the text which follows as distillate of the second reaction unit.

The process of the invention, through the use of a preliminary reactor in the first step, especially achieves a very high space-time yield since a majority of the hydrogen chloride formed, which limits the throughput of the first reaction unit, is already formed and removed in the preliminary reactor, and hence reduces the burden on the distillation column (=column) which follows downstream in the second step.

First Step:

Preferably, the alcohol which is used in the preliminary reactor for partial conversion of the chlorosilane(s) is the worked-up distillate from the first and/or second reaction unit, which is recycled into the preliminary reactor as distillate or as gas. It should be ensured that the residual water content of the alcohol is set to not more than 5% by weight. The alcohol preferably has no more than 4% by weight of water, and most preferably no water.

In the preliminary reactor and/or before being fed into the preliminary reactor, the distillate can additionally be admixed with additional alcohol and homogenized by means of a short mixing zone. For the reaction regime in the preliminary reactor, straight alkoxylation without condensation would be ideal. Since a completely anhydrous mode of operation is impossible for economic and physical reasons, at least a very low-water mode of operation of the process of the invention is effected.

The alcohols used are preferably those hydrocarbon compounds having an alcoholic hydroxyl group which can be used for preparation of alkoxysilanes or for preparation of organopolysiloxanes by reaction of chlorosilane with alcohols and optionally water, the boiling points of which are below that of the alkoxysilane or organopolysiloxane to be prepared in each case. Preference is given to alkanols and ether oxygen-substituted alkanols each having 1 to 6 carbon atoms, such as methanol, ethanol, n- or isopropanol, beta-methoxyethanol, n-butanol or n-hexanol. Particular preference is given to methanol, ethanol, isopropanol and butanol, especially methanol and ethanol. It is also possible to use mixtures of various alcohols.

The hydrogen chloride formed in the process is preferably freed of the condensable components at the top of the preliminary reactor (in the first step) and at the top of the first reaction unit (in the second step), and these in turn are recycled back into the corresponding reaction unit. The hydrogen chloride is thus available in gaseous form for recovery thereof.

Chlorosilanes or chlorosilane mixtures used are preferably those which are already being used in the prior art for preparation of alkoxysilanes or organopolysiloxanes by reaction of chlorosilane with alcohol and optionally water. These are especially silanes of the general formula (I)

$$R_nSiCl_{4-n} \qquad (I)$$

where

R is a hydrogen radical or a substituted or unsubstituted acid-stable C1-C18 hydrocarbyl radical optionally substituted by heteroatoms and n may have the values of 0, 1, 2 or 3, with the proviso that n in not more than 50% of the silanes of the formula (I) has the value of 3 and n in at least 20% of the silanes of the formula (I) has the value of 0 or 1.

Since chlorosilanes are being used here, acid stability of the R radical means stability against attack by hydrochloric acid.

In all formulae in the present invention, the symbols have their definitions independently of one another. The silicon atom is always tetravalent.

Selected examples of hydrocarbyl radicals R are alkyl radicals such as the methyl, ethyl, n-propyl, isopropyl, n-butyl, isobutyl, tert-butyl, n-pentyl, isopentyl, neopentyl, AND tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as tolyl radicals, xylyl radicals and ethylphenyl radicals; and aralkyl radicals such as the benzyl radical and the β-phenylethyl radical. Particularly preferred hydrocarbyl radicals R are the methyl, n-propyl and phenyl radicals.

The silanes of the formula (I) can be used either in the form of pure silanes or as a mixture of various silanes of the formula (I), in order to react them with alcohol in the preliminary reactor of the first step to give the partial alkoxylate. In the second step, it is possible to include further chlorosilanes of the formula (I) in the reaction, which differ from those in the preliminary reactor. They are fed directly into the first reaction unit, i.e. into the column.

This reaction regime is effected when various silanes of the formula (I) which have distinctly different boiling points and possibly different reactivities are to be converted, and these differences cannot be compensated for to a sufficient degree by the partial alkoxylation in the preliminary reactor for the first step. In this case, higher-boiling silanes of the formula (I) are always fed into the first reaction unit of the second step, while the lower-boiling silanes of the formula (I) are fed into the preliminary reactor of the first step for partial alkoxylation.

The partial alkoxylates formed by the partial alkoxylation from the lower-boiling silanes of the formula (I) have higher boiling points than the silanes of the formula (I) themselves, such that the boiling points of the different silanes can be assimilated in this way. Therefore, this embodiment of the process of the invention is preferably employed when silanes of the formula (I) having a boiling point below or in the region of the boiling point of the alcohol are used. It is to be expected that these silanes will be partly discharged from the column because of their low boiling point, as a result of which the reactant composition no longer corresponds to the desired stoichiometry. In order to counter this, it would be possible to increase the amount of low-boiling silanes. However, this would mean a deterioration in economic viability and an increase in the amounts of waste. Moreover, the chlorosilanes of the formula (I) can crosslink as a result of condensation in the offgas stream and in scrubbers, and it is possible for insoluble products to form, which subsequently also lead to silicification of the plant. The procedure of the invention avoids these problems. Since the most reactive Si—Cl bonds are the first to react in the partial alkoxylation, this step also achieves assimilation of the reactivity of various chlorosilanes of the formula (I).

If the different chlorosilanes of the formula (I) that are optionally to be reacted with one another have distinctly different reactivities, it is possible to assimilate the reactivity by means of the same procedure in which the less reactive and higher-boiling silanes of the formula (I) are fed into the first reaction unit, by reducing the reactivity of the more highly reactive and possibly lower-boiling chlorosilane of the formula (I) through the partial alkoxylate formation. The end result is achievement of a better statistical distribution of the different silane units in the resulting polyorganosiloxane.

If formation of blocks of individuals silane units in the desired polyorganosiloxane is desired or undisruptive, the procedure suitable in the corresponding case can be easily derived and adapted from the statements made above, in order to utilize the differences in reactivity.

The preliminary reactor may consist, for example, of a stirred tank, a tubular reactor or a loop reactor with or without forced circulation. In the case of a straight alkoxylation reaction, forced circulation is not harmful, but not necessary either, since the hydrogen chloride formed in the reaction is already sufficient to ensure adequate circulation and mixing. In the case of additional metered addition of water, preference is given to forced circulation, and particular preference is given to a preliminary reactor with a high mixing ability, for example a loop reactor.

Preferably, a liquid chlorosilane or a chlorosilane mixture of chlorosilanes of the formula (I) is introduced into the preliminary reactor, in which case not more than 80 mol % of the Si-bonded chlorine units are reacted with alcoholic hydroxyl groups in the preliminary reactor.

Hydrogen chloride gas formed in the preliminary reactor is led off and recycled after removal of the cooling brine-condensable components. These condensed components are recycled back into the preliminary reactor.

The preliminary reactor is preferably operated at a temperature below the boiling point of the chlorosilane used or the chlorosilane mixture used.

Second Step

In a second step, partly converted reaction mixture (=partial alkoxylate=partly alkoxylated chlorosilane) from the first step is transferred into a column of the first reaction unit. This can be accomplished, for example, by means of an overflow apparatus from the preliminary reactor. In the first reaction unit, there is further mixing and a) reaction of the reaction mixture with alcohol and water to give hydrogen chloride gas and a liquid crude product. The hydrogen chloride gas obtained is removed from the column and recycled after removal of condensable constituents. The constituents condensable with cooling brine can be transferred into the preliminary reactor, if it has been ensured that the amount of water introduced remains below the requirements already described. In a further embodiment b), a further chlorosilane or a chlorosilane mixture of chlorosilanes of the formula (I) is added directly to the first reaction unit and reacted with the partial alkoxylate, alcohol and water.

Preferably, the temperature of the column of the first reaction unit is not more than 120° C. More preferably not more than 100° C.

The liquid organopolysiloxane produced in the second step has a low condensation level combined with high alkoxy contents and additionally, in the form of a pure isolated product, in each case has a low viscosity, and is thus an organopolysiloxane having a low level of condensation.

The organopolysiloxanes having a low level of condensation from the second step are intermediates, and so they are referred to in the text which follows, for better distinguishability and linguistic resolution, as silicone resin intermediates. This choice of terminology is made for purely rhetorical reasons and is therefore not supposed to mean any restriction at all in terms of content.

The viscosity of the isolated, devolatilized silicone resin intermediates downstream of the first reaction unit is not more than 600 mPas, preferably not more than 500 mPas, and more preferably not more than 400 mPas, in each case at 25° C.

The alkoxy content of the pure devolatilized silicone resin intermediates downstream of this first reaction unit is at least 20% by weight, preferably at least 22% by weight, and especially at least 25% by weight. The amount of silicon-bonded chlorine in this silicone resin intermediate from the first reaction unit is at most 100 ppm, preferably at most 75 ppm, more preferably at most 50 ppm, and most preferably at most 30 ppm.

Third Step

The reaction mixture comprising the silicone resin intermediate from the second step is transferred into a second reaction unit comprising a loop reactor or stirred batchwise reactor, with continuous feed and drain. Additionally conceivable is the use of stirred tank cascades composed of at least two stirrers and connected in a continuous system. The third step can also be executed batchwise, in that a simple stirrer system is used, by executing the reaction with a suitable hold time and then discharging it for workup.

In this second reaction unit, the further reaction a) with alcohol and water and in the presence of catalytic traces of hydrogen chloride which have been introduced from steps 1 and 2 is effected, condensed up to the desired level of condensation (=highly condensed, branched organopolysiloxanes=end product). Preferably, the mixture in the second reaction unit contains water in amounts of 4 to 17 parts by weight, more preferably of 6 to 14 parts by weight, alcohol in amounts of 50 to 120 parts by weight, more preferably of 60 to 100 parts by weight, and hydrogen chloride in amounts of 0.02 to 0.1 parts by weight, more preferably of 0.04 to 0.08 parts by weight, based in each case on 100 parts by weight of pure devolatilized silicone resin intermediates from the second step.

In a further embodiment b), the reaction with alcohol and water and in the presence of catalytic traces of hydrogen chloride is effected with addition of further alkoxy- and/or hydroxy-functional organopolysiloxanes or alkoxy- and/or hydroxy-functional silanes. These further alkoxy- and/or hydroxy-functional organopolysiloxanes or alkoxy- and/or hydroxy-functional silanes are preferably in liquid form or they are soluble in the alcohol or the alcohol mixture which served for preparation of the partial alkoxylate in the preliminary reactor.

The additional alkoxy- and/or hydroxy-functional organopolysiloxanes are those composed of repeat units of the formula (IV):

$$R_p Si(OR^1)_q O_{(4-p-q)/2} \qquad \text{Formula (IV):}$$

where
R has the definition given above,
$R^1$ are identical or different monovalent $C_1$-$C_6$-alkyl radicals or hydrogen,
p and q are 0, 1, 2 or 3,
with the proviso that $$p+q \leq 3 \text{ and}$$

p in at least 20%, preferably in at least 30% and more preferably in at least 40% of all repeat units of the formula (IV) has the value of 1.

The further additional alkoxysilanes have the general formula (V):

$$R^2{}_o Si(OR^1)_{4-o} \qquad \text{(Formula (V):}$$

where
$R^2$ is a hydrocarbyl radical unsubstituted or substituted by heteroatoms, where no nitrogen atoms are present as heteroatoms,
$R^1$ has the definition given above and
o is 0, 1, 2 or 3.

A great advantage of the process of the invention is that the further hydrolysis and condensation in the third step is effected without addition of further polar or nonpolar solvents and only with the use of the alcohol or alcohol mixture used as reactant to give the end product, the branched organopolysiloxanes having the desired level of condensation.

Description of Execution:

There follows a description of the performance of the process of the invention using the example of an apparatus which was also used in the examples which follow. The plant comprises a preliminary reactor (first step), a column with a circulation apparatus (second step) and a loop (third step). The preliminary reactor is a loop reactor having a centrifugal pump regulatable with valves, which pumps the liquid contents in circulation with maximum turbulence.

First Step:

The chlorosilane and distillate from the second reaction unit are metered into the preliminary reactor at the lower end. Alcohol is optionally metered into the distillate and the mixture is homogenized by means of a short mixing zone. The contents of the preliminary reactor are introduced into the first reaction unit by means of an overflow apparatus.

The preliminary reactor has, at the top end, an outlet for the hydrogen chloride gas formed. This gas is freed of condensable components by means of a water cooler and optionally a brine cooler, the condensable components being recycled directly back into the preliminary reactor. The hydrogen chloride gas obtained downstream of the cooler can be recovered.

Second Step:

The first reaction unit consists of a circulation evaporator and a column positioned thereon. The column of the first reaction unit has, at the top, first a water-driven cooler and then a brine-driven cooler. The distillates obtained therein are fed back into the column. The hydrogen chloride gas obtained downstream of the cooler can be recovered.

Third Step:

The second reaction unit consists of a loop or of a stirred batchwise reactor with continuous feed and drain, a stirred tank cascade connected in a continuous system, or a batchwise stirrer system, preference being given to the loop. A further variant is batchwise postcondensation in the batchwise reactor.

As much reaction product mixture as is obtained by the reaction is pumped continuously out of the circulation evaporator of the first reaction unit by means of a centrifugal pump, and it is mixed with further water, optionally ethanol and catalytic amounts of hydrochloric acid or chlorosilane and converted in the loop of the second reaction unit. End product is removed from this loop of the second reaction unit in the amount in which it is formed.

The silicone resin intermediates which are obtained from the second step can be obtained as pure stable products by customary workup measures comprising the steps of filtration, distillation and blending, or can be formulated with other components to give formulations. Such components for formulations include, apart from other silicon-containing components, also organic monomers or organic polymers, water, solvents, auxiliaries such as emulsifiers, stabilizers, pH modifiers or further additives, fillers, pigments and building materials; this enumeration should be regarded as being merely illustrative and not as being restrictive.

The silicone resin intermediates are those formed from repeat units of the formula (II):

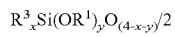
$R^3_x Si(OR^1)_y O_{(4-x-y)/2}$  Formula (II):

where $R^3$ is an R or $R^2$ radical, in each case with the definitions given above, $R^2$ has the definition given above, x and y are the values of 0, 1, 2 or 3, with the proviso that x+y≤3 and x in at least 20%, preferably in at least 30% and more preferably in at least 40% of all repeat units of the formula (II) has the value of 1, and may even have the value of 1 in 100% of all repeat units of the formula (II), and x, averaged over all repeat units of the formula (II), has an average value of 0.8 to 1.9, preferably of 0.85 to 1.9, and more preferably a value of 0.9 to 1.8, where, more preferably, x=1 and x=2, y averaged over all repeat units of the general formula (II) has an average value of 0.6 to 2.0, preferably of 0.7 to 1.9 and more preferably of 0.8 to 1.9, wherein the silicone resin intermediates are especially characterized in that they contain at least 20 percent by weight of $OR^1$ radicals, preferably at least 21 percent by weight, more preferably at least 22 percent by weight, especially at least 23 percent by weight, where, in the silicone resin intermediates, the $OR^1$ unit represents hydroxyl groups to an extent of not more than 10% by weight, preferably not more than 9% by weight, more preferably not more than 8% by weight, and especially not more than 7%. Silanol groups need not necessarily be present in the silicone resin intermediates formed from repeat units of the formula (II).

The silicone resin intermediates have molecular weights in the range from 600 to 8000 g/mol (weight average $M_w$) with a polydispersity (=PD) of not more than 12. They preferably have an $M_w$ of 650-5000 g/mol with a polydispersity of not more than 10, more preferably have an $M_w$ of 700-4000 g/mol with a polydispersity of not more than 8, and they especially have an $M_w$ of 700-3000 g/mol with a polydispersity of not more than 6. They are liquid in the form of pure products, their viscosities being in the range from 10 to 2000 mPas, preferably 25-1500 mPas and more preferably from 30 to 1000 mPas at 25° C. and standard pressure.

The end products that are obtained from the third step can be obtained as pure stable end products by customary workup measures comprising the steps of filtration, distillation and blending, or be formulated with other components to give formulations. The end products from this third step are liquid, highly viscous or solid, as isolated pure end products, according to the level of condensation to which they have been condensed. The level of condensation obtained is dependent on the reaction conditions that are chosen in the second reaction unit. More particularly, the level of condensation is determined by the amount of water and acid and the temperature, and by the nature of the acid chosen and the metering sequence and the metering rate which is chosen in the second reaction unit. In principle, any desired combinations of these parameters are conceivable, and the choice thereof affects the result to be achieved. Since the process in its entire overall variability is the subject of the invention, it is fundamentally the case that no possible combinations are ruled out, except those that are obviously senseless because it is obvious in respect of these from already known prior art that they do not lead to the production of soluble or fusible and hence further-processible organopolysiloxanes. What is surprising about the present process is the fact that, by contrast with the prior art, the variability of the process and the resulting product variety is achievable without the use of polar or nonpolar organic solvents, apart from the alcohol or alcohol mixture already used in the preliminary reactor.

Fluid to thick liquid end products are preferably obtained when the reaction in the third step is effected with water in amounts of 4 to 10 parts by weight, based on 100 parts by weight of the pure devolatilized silicone resin intermediates from the second step.

Viscous to solid products are preferably obtained in the third step when the mixture contains water in amounts of 10 to 17 parts by weight, based on 100 parts by weight of pure devolatilized silicone resin intermediates from the second step.

Preferably, the water used is partly demineralized water, fully demineralized water, distilled water or (multiply) redistilled water and water for medical or pharmaceutical purposes, more preferably partly demineralized water and fully demineralized water.

Preferably, the water used in accordance with the invention has a conductivity at 25° C. and 1010 hPa of not more than 50 µS/cm. preferably, the water used in accordance with the invention is air-saturated, clear and colorless.

Preference is given to using the same alcohol in all steps, preferably methanol or ethanol. The ethanol may contain standard denaturing agents, such as methyl ethyl ketone, petroleum ether or cyclohexane, preference being given to methyl ethyl ketone.

In the third step, hydrogen chloride can be added in the form of hydrochloric acid or in the form of a precursor, such as chlorosilane, acid chloride or linear phosphorus nitrile chloride, preference being given to hydrochloric acid solution and especially aqueous hydrochloric acid solution.

In the third step, the components are preferably metered in individually, mixed briefly and thus metered into the loop. In the case of a closed loop, the components can also be metered in individually upstream of the circulation pump.

Preferably, the closed loop is operated at an absolute pressure of 1 to 5 bar and temperatures of 5 to 10° C. below the boiling temperature, with a mean residence time of 60 to 150 min and with laminar to turbulent flow.

In the third step, the stirred batchwise reactor with continuous feed and drain is preferably operated at an absolute pressure of 1 bar and the boiling temperature of the mixture, and with a mean residence time of 60 to 150 min. The mean residence time is calculated from the reaction volume divided by the removal rate of the reaction product.

Components which are used together with the end product from step 3 in formulations here as well as other liquid or solid silicon-containing components are also organic monomers or organic polymers, water, solvents, auxiliaries such as emulsifiers, stabilizers, pH modifiers or further additives; this enumeration should be regarded as being merely illustrative and not as being restrictive.

The end products from the third step are those formed from repeat units of the formula (III):

$$R^3_a Si(OR^1)_b O_{(4-a-b)/2}$$  Formula (III):

where $R^3$ and $R^1$ have the definitions already given above, a and b are 0, 1, 2 or 3, with the proviso that a+b≤3 and a in at least 20%, preferably in at least 30% and more preferably in at least 40% of all repeat units of the formula (III) has the value of 1 and may even have the value of 1 in 100% of all repeat units of the formula (III), and a, averaged over all repeat units of the formula (III), has an average value of 0.8 to 1.9, preferably of 0.85 to 1.9 and more preferably a value of 0.9 to 1.8, and where, more preferably, a=1 and a=2 are values of a, b, averaged over all repeat units of the general formula (III), has an average value of 0.05 to 1.7, preferably of 0.06 to 1.6 and more preferably of 0.08 to 1.5, wherein the end products formed from repeat units of the formula (III) are especially characterized in that they contain not more than 25% by weight of $OR^1$ radicals, preferably not more than 24% by weight, more preferably not more than 23% by weight, especially not more than 22% by weight, where, in the end products formed from repeat units of the formula (III), the $OR^1$ unit represents hydroxyl groups to an extent of not more than 10% by weight, preferably not more than 9% by weight, more preferably not more than 8% by weight, and especially not more than 7% by weight. Silanol groups need not necessarily be present in the end products. At the same time, there are always at least 5% by weight fewer $OR^1$ radicals present in the end products than in the corresponding silicone resin intermediates, preferably at least 7% by weight, more preferably at least 10% by weight, especially at least 12% by weight, where 100 percent by weight of the $OR^1$ radicals in this case are the total number of the $OR^1$ radicals from the silicone resin intermediates formed from repeat units of the formula (II).

The end products formed from repeat units of the formula (III) have average molecular weights Mw in the range from 1000 to 50,000 g/mol (weight average) with a polydispersity of not more than 20. They preferably have an Mw of 1250-30,000 g/mol with a polydispersity of not more than 18, they more preferably have an Mw of 1500-20,000 g/mol with a polydispersity of not more than 15, and they especially have an Mw of 1500-15,000 g/mol with a polydispersity of not more than 13. The Mw of the end products formed from repeat units of the formula (III) is at least 1.1 times the Mw of the silicone resin intermediates formed from repeat units of the formula (II), preferably at least 1.2 times, more preferably at least 1.3 times, and especially at least 1.4 times. Since the end products formed from repeat units of the formula (III) may be fluid or of high viscosity or solid, they can cover a very wide viscosity range. If they are liquid organopolysiloxanes, their viscosity is preferably >600 mPas, more preferably >750 mPas and most preferably >1000 mPas at 25° C. and standard pressure.

The silicone resin intermediates prepared by the process of the invention or the end products or the formulations obtainable therefrom are of good suitability for use in anticorrosion formulations. They are especially suitable for use for the purpose of corrosion protection at high temperature. Apart from for the purpose of high-temperature-resistant corrosion protection, the silicone resin intermediates or end products produced by the process of the invention or the formulations obtainable therefrom can also be used for corrosion protection of reinforcement steel in reinforced concrete, in which case it is possible here to use the silicone resin intermediates of the invention or the end products or the formulations obtainable therefrom either in pure form or in formulations. Corrosion-inhibiting effects in reinforced concrete are achieved here either when the silicone resin intermediates of the invention or the end products or the formulations thereof that comprise them are introduced into the concrete mixture before it is shaped and set or by the direct application thereof to the surface of the concrete after the concrete has set.

The silicone resin intermediates or the end products or the formulations thereof can be used as binders for production of synthetic rocks for indoor and outdoor use.

Apart from for the purpose of corrosion protection of metals, the silicone resin intermediates produced by the process of the invention or the end products can also be used for manipulation of further properties of formulations or of solid bodies or films obtainable therefrom:

controlling the electrical conductivity and the electrical resistance controlling the leveling properties of a formulation controlling the gloss of a moist or cured film or an object increasing weathering resistance increasing chemical resistance increasing hue stability reducing the tendency to chalking reducing or increasing bond friction and sliding friction on solid bodies or films stabilizing or destabilizing foam in the formulation improving the adhesion of the formulation controlling the filler and pigment wetting and dispersing characteristics, controlling the rheological properties of the formulation, controlling the mechanical properties, for example flexibility, scratch resistance, elasticity, extensibility, bending capacity, breaking characteristics, resilience characteristics, hardness, density, tear propagation resistance, compression set, behavior at different temperatures, coefficient of expansion, abrasion resistance and further properties, such as thermal conductivity, combustibility, gas permeability, stability to water vapor, hot air, chemicals, weathering and radiation, and sterilizability of solid bodies or films controlling electrical properties, for example dielectric loss factor, breakdown resistance, dielectric constant, leakage current resistance, arc resistance, surface resistivity, specific breakdown resistance, flexibility, scratch resistance, elasticity, extensibility, bending capacity, breaking characteristics, resilience characteristics, hardness, density, tear propagation resistance, compression set and behavior at various temperatures of solid bodies or films.

Examples of applications in which the silicone resin intermediates or end products produced by the process of the invention can be used in order to manipulate the above-identified properties are the production of coating materials and impregnations and coatings and overcoats to be obtained therefrom on substrates such as metal, glass, wood, mineral substrate, synthetic and natural fibers for production of textiles, carpets, floor coverings, or other goods producible from fibers, or leather, plastic such as films, moldings. The silicone resin intermediates or end products can be used in formulations, given appropriate selection of the formulation components, additionally as an additive for the purpose of defoaming, of promoting leveling, hydrophobization, hydrophilization, filler and pigment dispersion, filler and pigment wetting, substrate wetting, promotion of surface smoothness, reduction of bonding and sliding resistance on the surface of the cured composition obtainable from the additized formulation. The silicone resin intermediates and end products produced by the process of the invention can be incorporated into elastomer compositions in liquid form or in cured solid form. In this case, it can be used for the purpose of strengthening or for improving other use properties, such as controlling the transparency, heat resistance, propensity to yellowing, weathering resistance.

All the above symbols in the above formulae each have their definitions independently of one another. In all formulae, the silicon atom is tetravalent.

In the present text, substances are characterized by reporting of data which are obtained by means of analysis using instruments. The underlying measurements are either conducted following publicly available standards or ascertained by specifically developed methods. In order to assure the clarity of the teaching imparted, the methods used are specified here:

Viscosity:

Unless stated otherwise, viscosities are determined by rotary viscometry measurement according to DIN EN ISO 3219. Unless stated otherwise, all viscosity figures are applicable at 25° C. and standard pressure of 1013 mbar.

Refractive Index:

Refractive indices are determined within the wavelength range of visible light, unless stated otherwise at 589 nm at 25° C. and standard pressure of 1013 mbar according to standard DIN 51423.

Transmission:

Transmission is determined by UV VIS spectroscopy. An example of a suitable instrument is the Analytik Jena Specord 200. The measurement parameters used are range: 190-1100 nm step width: 0.2 nm, integration time: 0.04 s, measurement mode: step operation. First, the reference (background) is measured. A quartz plate secured to a sample holder (dimensions of the quartz plates: H×W about 6×7 cm, thickness about 2.3 mm) is placed into the sample beam path and measured with respect to air.

This is followed by the sample analysis. A quartz plate secured to the sample holder with the sample applied—layer thickness of sample applied about 1 mm—is placed into the sample beam path and analyzed with respect to air. Internal calculation versus the background spectrum gives the transmission spectrum of the sample.

Molecular Compositions:

Molecular compositions are determined by means of nuclear resonance spectroscopy (for terminology see ASTM E 386: High-Resolution Nuclear Magnetic Resonance Spectroscopy (NMR): Terms and Symbols), with analysis of the $^1$H nucleus and the $^{29}$Si nucleus.

Description of 1H NMR Analysis
 Solvent: $CDCl_3$, 99.8% d
 Sample concentration: about 50 mg/1 mL $CDCl_3$ in 5 mm NMR tubes
 Analysis without addition of TMS, referencing of spectra with residual $CHCl_3$ in $CDCl_3$ at 7.24 ppm
 Spectrometer: Bruker Avance I 500 or Bruker Avance HD 500
 Sample head: 5 mm BBO sample head or SMART sample head (from Bruker)
 Measurement Parameters:
 Pulprog=zg30
 TD=64 k
 NS=64 or 128 (depending on the sensitivity of the sample head)
 SW=20.6 ppm
 AQ=3.17 s
 D1=5 s
 SFO1=500.13 MHz
 O1=6.175 ppm
 Processing Parameters:
 SI=32 k
 WDW=EM
 LB=0.3 Hz
 According to the spectrometer type used, individual adjustments to the measurement parameters may be required.

Description of $^{29}$Si NMR Analysis
 Solvent: $C_6D_6$ 99.8% d/$CCl_4$ 1:1 v/v with 1% by weight of Cr(acac)3 as relaxation reagent
 Sample concentration: about 2 g/1.5 mL of solvent in 10 mm NMR tubes
 Spectrometer: Bruker Avance 300
 Sample head: 10 mm 1H/13C/15N/29Si glass-free QNP sample head (from Bruker)
Measurement Parameters:
 Pulprog=zgig60
 TD=64 k
 NS=1024 (depending on the sensitivity of the sample head)
 SW=200 ppm
 AQ=2.75 s
 D1=4 s
 SFO1=300.13 MHz
 O1=−50 ppm
Processing Parameters:
 SI=64 k
 WDW=EM
 LB=0.3 Hz
 According to the spectrometer type used, individual adjustments to the measurement parameters may be required.

Molecular Weight Distributions:

Molecular weight distributions are determined as the weight average Mw and as the number average Mn, employing the method of gel permeation chromatography (GPC or size exclusion chromatography (SEC)) with polystyrene standard and a refractive index detector (RI detector). Where not explicitly specified, THF is used as the eluent and DIN 55672-1 is employed. The polydispersity (PD) is the quotient Mw/Mn.

Glass Transition Temperatures:

The glass transition temperature is determined by differential scanning calorimetry (DSC) according to DIN 53765, pierced crucible, heating rate 10 K/min.

EXAMPLES

The process of the invention is described in examples hereinafter, but these shall not be interpreted as being restricted thereto. All percentages are based on weight. Unless stated otherwise, all manipulations are executed at room temperature of about 25° C. and under standard pressure (1.013 bar). The apparatuses are standard laboratory equipment as supplied commercially by numerous equipment manufacturers.

Ph means a phenyl radical=$C_6H_5$—.

Me means a methyl radical=$CH_3$—. $Me_2$ correspondingly means two methyl radicals.

$^i$Oct means an isooctyl radical, or a 2,2,4-trimethylpentyl radical, which is the same.

Example 1: Comparative Example, Noninventive: Preparation of Condensed Organopolysiloxane Resins Using a Preliminary Reactor, a Reaction Column and a Stripping Column, According to DE102005003898 A1

40 kg/h of M1 trichlorosilane (methyltrichlorosilane) are fed continuously to a preliminary reactor connected upstream of the reaction column. This involves feeding the condensate consisting of ethanol/HCl from the stripping column 2 to the preliminary reactor in such a way that the M1 trichlorosilane is partly alkoxylated. The HCl released is led off in gaseous form from the preliminary reactor via the offgas line.

This reaction mixture containing partly alkoxylated M1 trichlorosilane is transferred continuously from the preliminary reactor into the upper third of the reaction column. It reacts there with the ethanol coming from below in countercurrent [5 kg/h of ethanol metered in in the bottom of the reaction column] to give M1 trimethoxysilane, with the residual amounts of HCl being led off into the offgas line via the top of reaction column 1.

The alkoxylate is obtained in the bottom of the reaction column, where appropriate amounts of water [4.8 kg/h-6.5 kg/h of water metered in in the bottom of the reaction column] are added continuously for condensation. The acidic HCl-containing reaction mixture is applied from the bottom of the reaction column to the upper third of the stripping column and here likewise freed of residual amounts of HCl in countercurrent by the ethanol ascending from the bottom of the stripping column [9 kg/h of ethanol metered in in the bottom of the stripping column]. The desired product is then removed continuously from the bottoms outlet of the stripping column.

As apparent from the result, following this process, it is not possible at least in a solvent-free manner, i.e. free of a solvent that does not correspond to the alcohol used for the alkoxylation reaction, to establish any desired level of condensation, since this is always opposed by gel formation.

This comparative example was varied with the amounts of water required for condensation that are shown in table 1.

The products obtained are described in terms of their viscosity and molecular weight distribution, and their residual alkoxy content (via $^1$H NMR).

Table 1 below gives an overview of the product data obtained.

TABLE 1

| Alkoxy content % by weight | Viscosity mm²/s | Gel formation | High molecular weight components | Mw | Mn | PD | Water kg/h |
|---|---|---|---|---|---|---|---|
| 35 | 5 | no | no | 1200 | 600 | 2.7 | 2.9 |
| 33 | 10.8 | no | yes | 4000 | 800 | 4.8 | 4.8 |
| 18 | 1060 | commencing | yes | 7900 | 1500 | 5.4 | 6.3 |
| 6 | not measurable | yes | gel | not measurable | | | 6.8 |

Example 2: Process of the Invention, Fully Continuous Version. Combination of Column with Preliminary Reactor and Loop The apparatus used for the implementation of steps 1 and 2 is a continuous alkoxylation plant consisting of a preliminary loop reactor having a capacity of 2 L and a circulation evaporator of size 2.5 L, atop which there is a reaction column of length 5 m and having a clear width of 50 mm, followed by a loop reactor having a capacity of 1.5 L in which step 3 of the process proceeds.

The preliminary reactor is charged with 1500 g of a mixture of 150 g of isooctyltrichlorosilane and 1350 g of methyltrichlorosilane.

The circulation evaporator is charged with 2000 g of ethanol and adjusted to a bottom temperature of 78° C. (reflux of ethanol).

The reaction loop with capacity 1.5 liters is charged with a mixture consisting of equal parts by weight of the alkoxy-oligomeric polyorganosiloxane obtainable from steps 1 and 2 and ethanol, heated to 60° C. and pumped in circulation.

The chlorosilane mixture in the preliminary reactor is pumped in circulation and 500 g of ethanol are metered in.

Subsequently, the metered addition into the preliminary reactor is adjusted such that 1500 g/h of a mixture consisting of 1 part iso-octyl-trichlorosilane and 9 parts methyltrichlorosilane and 500 g/h of ethanol are constantly being metered in.

The chlorosilane mixture is partly alkoxylated in the preliminary reactor, with the HCl formed escaping as a by-product of the reaction via an offgas conduit.

Downstream of the preliminary reactor, the reaction mixture is applied to the upper third of the reaction column. In addition, 500 g/h of ethanol and 140 g/h of water are supplied to the reaction system via the bottom of the reaction column and heated to reflux (b.p. of ethanol: 78° C.)

The partial alkoxylate coming from the preliminary reactor reacts with ethanol flowing in the opposite direction to give the alkylsilane trialkoxylate and is condensed in the bottom of the reaction column by the water to give the oligomer. The degree of oligomerization or polymerization is controllable via the amount of water used.

The tops distillate obtained from the reaction column is condensed and returned to the column just below the feed point of the reaction mixture from the preliminary reactor. It is not fed into the bottom of the reaction column or any point in the column closer to the bottom than the metering point specified. This is done in order to prevent an excessively high amount of acid reflux from getting into the bottom and making the condensation reaction uncontrollable there.

Thus, the HCl released here is removed completely from the reaction system via the offgas conduit, with the consequence that the silicone resin intermediate to be withdrawn from the bottom of the reaction column, without further workup, is obtained with a residual content of (titratable) HCl of less than 100 ppm. The silicone resin intermediate thus prepared in the bottom of the reaction columns can, if desired, be withdrawn from the bottom of the reaction column and characterized analytically. It features a low viscosity (<100 mm$^2$/s) and high residual alkoxy contents of >20% by weight.

In a typical example, the following analytical data were obtained for the silicone resin intermediate:
Molecular composition from $^{29}$Si NMR:
MeSiO$_{3/2}$+$^i$OctSiO$_{3/2}$: 12.6 mol %,
MeSi(OEt)O$_{2/2}$+$^i$OctSi(OEt)O$_{3/2}$: 51.4 mol %,
MeSi(OMe)$_2$O$_{1/2}$+$^i$OctSi(OEt)$_2$O$_{3/2}$: 29.3 mol %,
MeSi(OMe)$_3$+$^i$OctSi(OEt)$_3$: 5.49 mol %
Me$_2$SiO$_{2/2}$: 0.91 mol % (owing to low contents of dimethyldichlorosilane in methyltrichlorosilane)
Me$_2$Si(OEt)O$_{1/2}$: 0.36 mol % (owing to low contents of dimethyldichlorosilane in methyltrichlorosilane)
Ethoxy content: 36.6% by weight,
Content of $^i$OctSi(OEt)$_{0-3}$O$_{3-0/2}$: 8.9% by weight
Mw: 3600 g/mol
Mn: 800 g/mol
PD: 4.7

The reaction product from the bottom of the reaction column is introduced into the reaction loop in the amount in which it is formed. The reaction product consists here of the column bottoms composed of a mixture of equal parts of ethanol and silicone resin intermediate, as used for the filling of the reaction loop.

The reaction loop is initially charged by metered addition of 50 g of a 1.3% by weight aqueous hydrochloric acid solution, in order to start the reaction. The silicone resin intermediate from the bottom of the reaction column is subsequently supplied to the reaction loop together with aqueous hydrochloric acid (200 g/h of a 1.3% by weight aqueous HCl solution) in the amount in which condensed end product is removed from the reaction loop.

The reactant streams are such that a mean residence time of 15 minutes and a solids content (dissolved resin in alcohol) of 35-40% are established.

The condensed, acidic loop end product containing HCl that has been formed in this way is neutralized by means of a 30% solution of sodium methoxide in methanol and then filtered.

Thereafter, the alcoholic end product solution is distilled, and a liquid end product is obtained, which is defined by product parameters such as viscosity, residual alkoxy content and molecular weight distribution. In a typical example, the following analytical data were obtained:
Molecular composition from 29Si NMR:
MeSiO$_{3/2}$+$^1$OctSiO$_{3/2}$: 48.8 mol %,
MeSi(OEt)O$_{2/2}$+$^i$OctSi(OEt)O$_{3/2}$: 45.3 mol %,
MeSi(OMe)$_2$O$_{1/2}$+$^i$OctSi(OEt)$_2$O$_{3/2}$: 4.62 mol %,
MeSi(OMe)$_3$+$^i$OctSi(OEt)$_3$: 0.26 mol %
Me$_2$SiO$_{2/2}$: 1.06 mol % (owing to low contents of dimethyldichlorosilane in methyltrichlorosilane)
Me$_2$Si(OEt)O$_{1/2}$: 0.0 mol % (owing to low contents of dimethyldichlorosilane in methyltrichlorosilane)
Ethoxy content: 15.9% by weight,
Content of $^i$OctSi(OEt)$_{0-3}$O$_{3-0/2}$: 8.3% by weight
Further Product Parameters:
Viscosity: 3800 mm$^2$/s
Mw: 8000 g/mol
Mn: 1700 g/mol
PD: 4.7

Example 3: Process of the Invention, Semicontinuous Version. Combination of Column and Stirrer System 2744.29 g of the ethanolic solution of the silicone resin intermediate from the bottom of the reaction column from step 2, example 2, are mixed in a 5 L stirred vessel with 83.16 g of water and 2.31 g of 20% aqueous hydrochloric acid. The mixture is heated to 80° C., so as to form a reflux of ethanol. The mixture is stirred at this temperature for 2 hours.

Subsequently, the mixture is cooled to 60° C. and then 2.31 g of sodium methoxide solution (30% in methanol) are added. The residual hydrochloric acid content is determined by titration using phenolphthalein and is 5 ppm. Subsequently, all volatile constituents are distilled off at 80° C. and a reduced pressure of 10 mbar, and the end product obtained is filtered through a pressure suction filter through a filter plate having pore size 100 μm. 1100 g of a clear liquid product are obtained, having the following properties and composition:
Viscosity: 2941 mm$^2$/s
Molecular Weight and Polydispersity:
Mw=8600 g/mol
Mn=1100 g/mol
PD=7.8
Molecular composition from $^{29}$Si NMR:
MeSiO$_{3/2}$+$^i$OctSiO$_{3/2}$: 49.0 mol %,
MeSi(OEt)O$_{2/2}$+$^i$OctSi(OEt)O$_{3/2}$: 46.6 mol %,
MeSi(OMe)$_2$O$_{1/2}$+$^i$OctSi(OEt)$_2$O$_{3/2}$: 4.4 mol %,
Ethoxy content: 17.7% by weight,
0.54% of silicon-bonded OH groups Example 4: Process of the Invention, Semicontinuous Version. Combination of Column and Stirrer System with MSE 110

The first two steps are executed as described in example 2, except now using exclusively methyltrichlorosilane rather than the silanes methyltrichlorosilane and isooctyltrichlorosilane used in example 2. Rather than ethanol, methanol is used as the process alcohol; the temperature in the reaction column is now 64° C. rather than 78° C. All the other parameters are chosen as in example 2. A silicone resin intermediate dissolved in methanol is obtained, concentration 51%. In isolated form after distillative removal of all volatile constituents at 80° C. and a reduced pressure of 10 mbar, it has the following composition:
MeSiO$_{3/2}$: 30.3 mol %,
MeSi(OMe)O$_{2/2}$: 55.3 mol %,
MeSi(OMe)$_2$O$_{1/2}$: 13.4 mol %,
MeSi(OMe)$_3$: 0.4 mol %
Me$_2$SiO$_{2/2}$: 0.6 mol %,
Methoxy content: 28.9% by weight,
no silanol groups detectable.
Mw=2300 g/mol
Mn=600 g/mol
PD=3.8

In the third step, the silicone resin intermediate from the first two steps is fed in continuously at a rate of 1250 g/h in a stirred and heatable batchwise reactor having a reaction volume of one liter. In a second metered addition, 700 g/h of a mixture of 2500 g of methanol, 300 g of partly demineralized water and 15.2 g of 20% hydrochloric acid are fed in continuously. The reaction is operated at reflux. 1950 g/h of reaction mixture are pumped continuously out of the reactor into a further stirred vessel and mixed continuously with 4.15 g/h of 25% sodium methoxide solution in methanol. A sample from the stirred vessel has an HCl value of 25 mg HCl/kg. The sample (=end product), after devolatilization on a rotary evaporator at 100° C. and 20 mbar, is a toluene-soluble resin of high viscosity having a methoxy content of 13.7% by weight and a silanol content of 1.5% by weight.

$MeSiO_{3/2}$: 55.2 mol %,
$MeSi(OMe)O_{2/2}$: 41.3 mol %,
$MeSi(OMe)_2O_{1/2}$: 2.7 mol %,
$MeSi(OMe)_3$: 0.2 mol %
$Me_2SiO_{2/2}$: 0.6 mol %
Mw=4300 g/mol
Mn=900 g/mol
PD=4.8

The invention claimed is:

1. A fully continuous process for preparing branched organopolysiloxanes, comprising:
   a) in a first step, continuously reacting at least one chlorosilane with alcohol in a preliminary reactor to produce a partial alkoxylate, wherein
      a)i) 0.1 to 2.0 mol of alcohol is reacted per mole of hydrolyzable chlorine, and
      a)ii)) the alcohol contains not more than 5% by weight of water, and
   b) in a second step, transferring the partial alkoxylate obtained in the first step into a first reaction unit comprising a reaction column, and continuously reacting the partial alkoxylate with
      b)i) alcohol and water, or
      b)ii) alcohol, water and at least one further chlorosilane which differs from the chlorosilane(s) of the first step by being less volatile, and/or having a lower reactivity, to produce an incompletely condensed silicone resin intermediate, and either
   c) in a third step, transferring the silicone resin intermediate from the second step into a second reaction unit comprising at least one of a continuous loop reactor, a stirred batchwise reactor with continuous feed and drain, or a stirred tank cascade connected in a continuous system, and reacting the silicone resin intermediate with
      c)i) alcohol and water in the presence of catalytic traces of hydrogen chloride, or
      c)ii) alcohol and water in the presence of catalytic traces of hydrogen chloride, and with addition of further alkoxy- and/or hydroxy-functional organopolysiloxanes or alkoxy- and/or hydroxy-functional silanes, and further condensing to produce a branched organopolysiloxane end product, or having a targeted level of condensation, or
   d) in a third step, transferring the silicone resin intermediate from the second step into a second reaction unit comprising a stirred batchwise reactor and further condensing the silicone resin intermediate with,
      d)i) alcohol and water in the presence of catalytic traces of hydrogen chloride, or
      d)ii) alcohol and water in the presence of catalytic traces of hydrogen chloride, and further alkoxy- and/or hydroxy-functional organopolysiloxanes or alkoxy- and/or hydroxy-functional silanes,
   to produce a branched organopolysiloxane end product with a targeted level of condensation, with the proviso that no organic solvent other than the alcohol reacted is used over the entire process, the alcohol comprising a single alcohol or of a mixture of at least two different alcohols.

2. The process of claim 1, wherein the process is a continuous process.

3. The process of claim 1, wherein the alcohol in step a) contains not more than 4% by weight of water.

4. The process of claim 1, further comprising:
   condensing a hydrochloric acid-containing tops distillate of the reaction column of step b) and returning a condensate thusly obtained to the reaction column just below the feed point of the reaction mixture from the preliminary reactor to the reaction column, such that it does not reach the bottom of the reaction column, thereby removing the hydrochloric acid released in the reaction column completely from the reaction system, and obtaining the silicone resin intermediate from the bottom of the reaction column without further workup with a residual hydrochloric acid content of less than 100 ppm.

* * * * *